US00RE34139E

United States Patent [19]

Cooper et al.

[11] E Patent Number: Re. 34,139

[45] Reissued Date of Patent: Dec. 8, 1992

[54] ENGINE PISTON ASSEMBLY AND FORGED PISTON MEMBER THEREFOR HAVING A COOLING RECESS

[75] Inventors: Bruce C. Cooper, Chillicothe; Kenton L. Erickson, Dunlap; James A. Green; David S. Nycz, both of Peoria, all of Ill.

[73] Assignee: Caterpillar Inc., Peoria, Ill.

[21] Appl. No.: 762,203

[22] Filed: Sep. 19, 1991

Related U.S. Patent Documents

Reissue of:

[64] Patent No.: 4,867,119
Issued: Sep. 19, 1989
Appl. No.: 291,429
Filed: Dec. 23, 1988

U.S. Applications:

[63] Continuation-in-part of Ser. No. 261,663, Oct. 21, 1988, abandoned.

[51] Int. Cl.[5] ..... F02F 3/00

[52] U.S. Cl. ..... 123/193.6; 123/41.35; 92/239

[58] Field of Search ..... 123/193 P, 41.35, 254, 123/41.36; 92/239, 159, 6, 189, 190, 208

[56] References Cited

U.S. PATENT DOCUMENTS

| | | | |
|---|---|---|---|
| 2,296,478 | 9/1942 | Morgan | 92/159 |
| 2,308,178 | 1/1943 | Kishline | 92/159 |
| 2,407,429 | 9/1946 | Kuttner | 92/6 |
| 3,476,021 | 11/1969 | Williams . | |
| 3,971,355 | 7/1976 | Kottmann | 123/197 |
| 4,056,044 | 11/1977 | Kamman et al. | 92/159 |
| 4,083,292 | 4/1978 | Goloff . | |
| 4,129,108 | 12/1978 | Elsbett et al. | 123/193 |
| 4,180,027 | 12/1979 | Taylor | 123/41.35 |
| 4,207,808 | 6/1980 | Elsbett et al. | 92/158 |
| 4,256,022 | 3/1981 | Elsbett et al. . | |
| 4,270,494 | 6/1981 | Carter et al. | 120/193.6 |
| 4,286,505 | 9/1981 | Amdall | 92/186 |
| 4,377,967 | 3/1983 | Pelizzoni | 92/186 |
| 4,577,594 | 5/1986 | Deutschmann et al. | 123/41.35 |
| 4,581,983 | 4/1986 | Moebus | 92/186 |
| 4,608,947 | 9/1986 | Stadler . | |
| 4,638,769 | 1/1987 | Ballheimer | 123/41.84 |
| 4,644,853 | 2/1987 | Russell et al. | 92/190 |
| 4,662,047 | 5/1987 | Berchem | 29/156.5 |
| 4,704,950 | 11/1987 | Ripberger et al. | 92/208 |
| 4,781,159 | 11/1988 | Elsbett et al. | 123/193.6 |
| 4,805,518 | 2/1989 | Heban | 123/193.6 |

FOREIGN PATENT DOCUMENTS

| | | |
|---|---|---|
| 51212185 | 12/1985 | Australia . |
| 0106935 | 5/1984 | European Pat. Off. . |
| 2717084 | 3/1985 | Fed. Rep. of Germany . |
| 3425228 | 2/1986 | Fed. Rep. of Germany . |
| 3643039 | 6/1988 | Fed. Rep. of Germany . |
| 54-47937 | 4/1979 | Japan . |
| 60-187346 | 12/1985 | Japan . |
| 554918 | 7/1943 | United Kingdom . |

OTHER PUBLICATIONS

Technical Paper; Mahle Symposium (pp. 3; 77-89) dated May, 1973, by H. G. Braendel.

Technical Paper; Associated Engrg. Group Technical Symposium, Paper No. 7 Title: "Oil Cooled & Electron Beam Welded Pistons for Diesel Engs." dated 1978, by Dr. R. Monro, et al.

Technical Paper No. 780781; Society of Automotive Engineers, dated Sep. 11-14, 1978, by M. D. Roehrle.

Technical paper No. 770031; Society of Automotive Engineers, dated Feb. 28-Mar. 4, 1977, by M. D. Roehrle.

Application filed simultaneously herewith by: B. Ballheimer et al., for: Piston Assembly and Piston Member Thereof having a Predetermined Compression Height to Diameter Ratio.

Application filed simultaneously herewith by: Robert L. Weber et al., for: Engine Piston Assembly and Piston Member Therefor Having A High Top Ring Groove.

Application filed simultaneously herewith by: Marshall (NMI) Adams et al., for: A Method Of Producing A Crown For An Articulated Piston.

*Primary Examiner*—Albert J. Makay
*Assistant Examiner*—M. Macy
*Attorney, Agent, or Firm*—Sterne, Kessler, Goldstein & Fox

[57] ABSTRACT

Present day diesel engines having aluminum piston assemblies are limited to combustion chamber pressures of approximately 12,410 kPa (1,800 psi) whereas the desire is to increase such pressures up to the 15,170 kPa (2,200 psi) range. To reach such levels the instant piston assembly includes a steel piston member having an upper cylindrical portion defining a top surface, a depending tubular wall and an annular cooling recess having one or more machined surfaces of revolution about a central axis. The cooling recess is located beneath the top surface and juxtaposed to the top ring groove for removing heat away therefrom in use. The piston member is preferably forged and subsequently machined to precisely controllable dimensions. Moreover, the piston assembly is preferably of the articulated type and includes a forged aluminum piston skirt connected to the piston member through a common wrist pin.

12 Claims, 4 Drawing Sheets

ENGINE PISTON ASSEMBLY AND FORGED PISTON MEMBER THEREFOR HAVING A COOLING RECESS

Matter enclosed in heavy brackets [ ] appears in the original patent but forms no part of this reissue specification: matter printed in italics indicates the additions made by reissue.

This is a continuation-*in-part* of Ser. No. 07/261,663, filed Oct. 21, 1988, now abandoned.

TECHNICAL FIELD

This invention relates generally to a compact engine piston assembly for a high output internal combustion engine, and more particularly to a steel piston member capable of resisting relatively high combustion chamber pressures and temperatures and having machined surfaces of revolution.

BACKGROUND ART

The last several years has seen an increasing amount of emphasis on designing engines having improved fuel economy and efficiency, reduced emissions, a greater service life, and an increased power output per cylinder. The trend has resulted in increasingly more severe mechanical and thermal requirements on the piston members. The crown region of a piston member is heated by the burning fuel and air mixture. The piston assembly including the piston rings must make effective contact with the cylinder bore to prevent the egress of hot combustion gases and to control lubricating oil under all operating conditions. The temperature and combustion pressures on the piston member particularly must remain within prescribed material, structural and thermal limits or early failure will result.

The cooled composite piston assembly disclosed in U.S. Pat. No. 4,581,983 issued to H. Moebus on Apr. 15, 1986 is illustrative of one configuration that can withstand such increased power output levels. However, the upper and lower parts thereof are joined together by welding, and this is a costly process that is preferably to be avoided.

A more desirable type of piston assembly is disclosed in U.S. Pat. No. 4,056,044 issued to Kenneth R. Kamman on Nov. 1, 1977. The Kamman patent, which is assigned to the Assignee of the present invention, teaches the use of an articulated piston assembly having an upper piston member and a lower skirt which are individually pivotally connected to a common wrist pin. Oil directed to a trough in the skirt is advantageously splashed in a turbulent "cocktail shaker" action against a recess in the underside of the crown surface adjacent the ring grooves for cooling the interior of the piston. Subsequent extensive testing thereof with cast elements has indicated that the practical level of knowledge on casting procedures is insufficient to resist combustion pressures above about 13,790 kPa (2,000 psi). Specifically, an excessive number of the upper cast steel piston members had so much porosity that premature failure resulted. On the other hand, a few cast steel piston members were manufactured with relatively low levels of porosity so that they survived a relatively rigorous testing program. While extensive studies were conducted to minimize porosity levels in the cast members, the levels remain too high. One way to check for porosity is to fully x-ray piston, which not only is unacceptable from a cost stand point but also does not guarantee that the piston is totally free of porosity.

In addition to porosity considerations, it should be appreciated that the structural shape and strength of each element of an articulated piston assembly is in a continual stage of being modified to better resist higher compressive loads and thermally induced forces. For example, Society of Automotive Engineers, Inc. Paper No. 770031 authored by M. D. Roehrie, entitled "Pistons for High Output Diesel Engines", and presented circa Feb. 28, 1977, is indicative of the great number of laboratory tests conducted throughout the world on the individual elements. That paper also discusses a number of considerations to minimize cracking problems in light alloy or aluminum piston members resulting primarily from thermal constraints.

U.S. Pat. No. 4,662,047 issued to Rutger Berchem on May 5, 1987 discloses a one-piece piston produced by die pressing of a previously forged blank to bend an annular cylindrical collar thereon. A forged piston can offer the capability of resisting high combustion chamber pressures and temperatures; however, the forging of parts with relatively thin wall sections having extremely close dimensional tolerances and the forming of narrow and deep cavities having precise relative locations is very difficult, if not impossible. Therefore it is frequently the manufacturing tolerances that limit or prevent the forging of the thin wall sections and narrow deep cavities that are so desperately required for better heat dissipation. Complex shapes and varying wall thicknesses can also result in uneven heat distribution and differential thermal distortion of the piston, so another objective is to simplify the construction as much as possible including maximizing the symmetry thereof about the central axis.

Also, another problem to consider is that the relatively rough surface finish produced by the forging process can produce stress risers, and this is especially critical in the high load areas of the piston member such as in the thin wall sections and cavities. Oftentimes these crack propagation areas are undetectable with disastrous results.

Thus, what is needed is a high output engine piston assembly having a piston member therefor which is capable of continuous and efficient operation at combustion chamber pressures above about 13,790 kPa (2,000 psi), and preferably in the region of a bout 15,170 kPa (2,200 psi). Furthermore, the piston member should preferably be forged from an alloy steel material having a configuration substantially devoid of complex shapes to allow the forging thereof. Moreover, the region of the upper portion of the piston member and specifically the cooling recess region should preferably have relatively thin, substantially constant wall thicknesses for substantially even heat distribution and for maximum cooling of the surfaces. Also, the surfaces of the cooling recess should be machined surfaces of revolution for precise dimension control between adjacent surfaces and especially between the cooling channel and the ring grooves. The piston member should preferably include symmetrical surfaces of revolution about the central axis with the surfaces being free of imperfections that could cause the propagation of cracks and so that differential thermal distortion can be avoided.

The present invention is directed to overcoming one or more of the problems as set forth above.

DISCLOSURE OF THE INVENTION

In one aspect of the resent invention, a forged steel engine piston member is provided that includes an upper main portion of generally cylindrical shape and a relatively thin tubular wall depending from the top surface thereof, and having a lower end surface, and an inwardly facing wall surface extending upwardly from the end surface. The upper portion also has an annular outwardly facing wall surface spaced radially inwardly from the inwardly facing wall surface and a transition portion connected thereto and to the inwardly facing wall surface to collectively define an annular cooling recess. The inwardly facing wall surface, the outwardly facing wall surface and the downwardly facing transition portion are all fully machined surfaces of revolution. The piston member further has a lower portion including a pair of depending pin bosses individually defining a bore and with the bores being aligned.

In a further aspect of the invention, an engine piston assembly is provided for an engine having a block, a cylinder liner received in the block and defining a bore, and a cylinder head connected to the block. The assembly includes a forged steel piston member having an upper portion of a substantially cylindrical shape, a peripheral top surface, and a relatively thin tubular wall depending from the outer edge of the top surface and having lower end surface and a inwardly facing wall surface extending upwardly from the end wall surface. The upper main portion also has an annular outwardly facing wall surface spaced radially inward from the inwardly facing wall surface and a transition portion connected thereto and to the inwardly facing wall surface to collectively define an annular cooling recess. The inwardly facing wall surface, the outwardly facing wall surface and the downwardly facing transition wall surface are all fully machined surfaces of revolution. The piston member further has a lower portion including a pair of depending pin bosses individually defining a bore and with the bores being aligned. A lower portion of the forged steel piston member includes a pair of pin bosses blendingly associated with the recess and individually having a bore therein. The piston assembly of the present invention has a steel piston member with a non-complex shape so that it can conveniently be forged and machined, is yet has a cross sectional configuration that is capable of resisting combustion chamber pressures in a range in excess of 13,790 kPa (2,000 psi) and is lightweight.

BEST MODE FOR CARRYING OUT THE INVENTION

Figure 1:
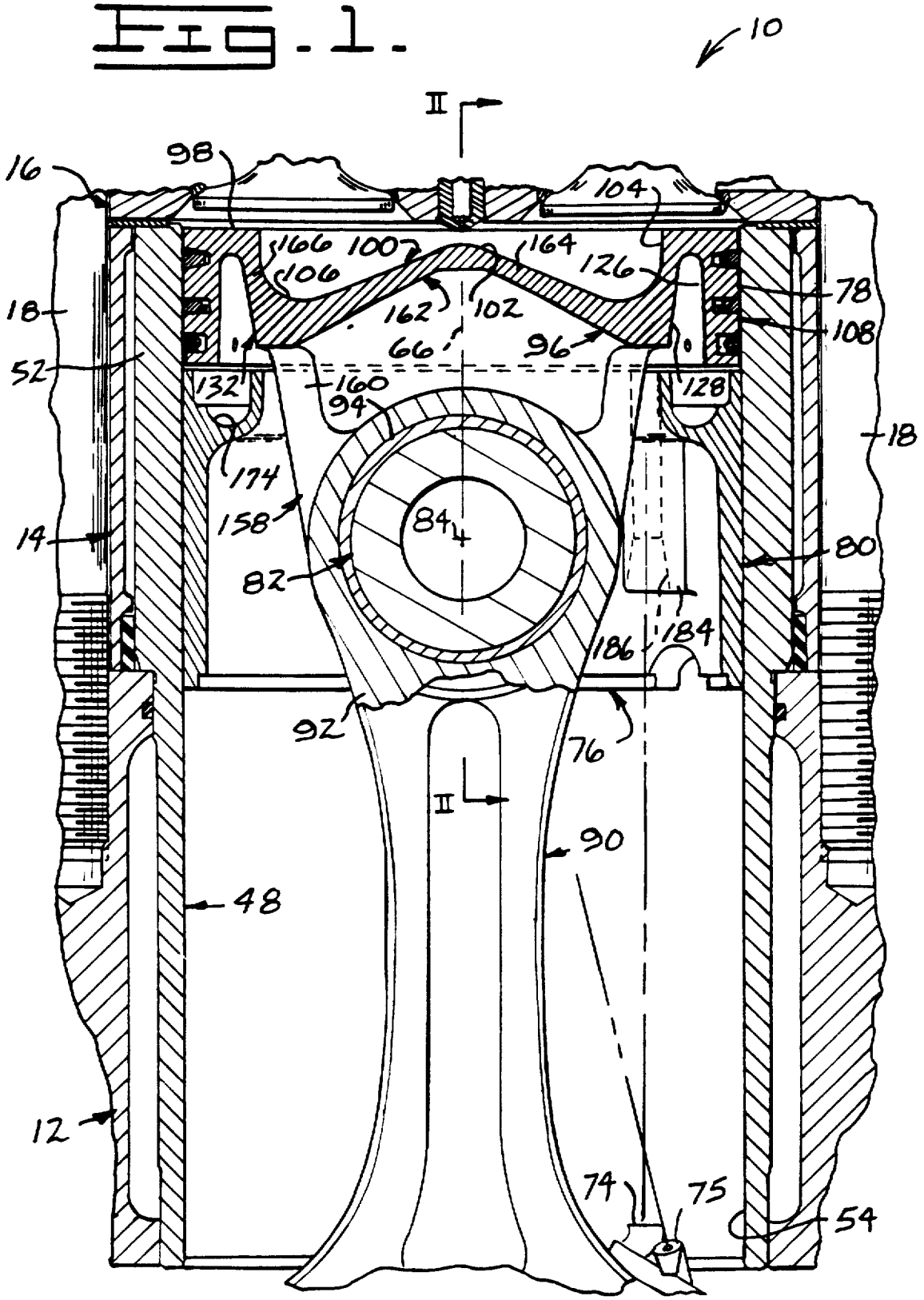
FIG. 1 is a diagrammatic, fragmentary, transverse vertical sectional view of an engine piston assembly constructed in accordance with the present invention.
Figure 2:
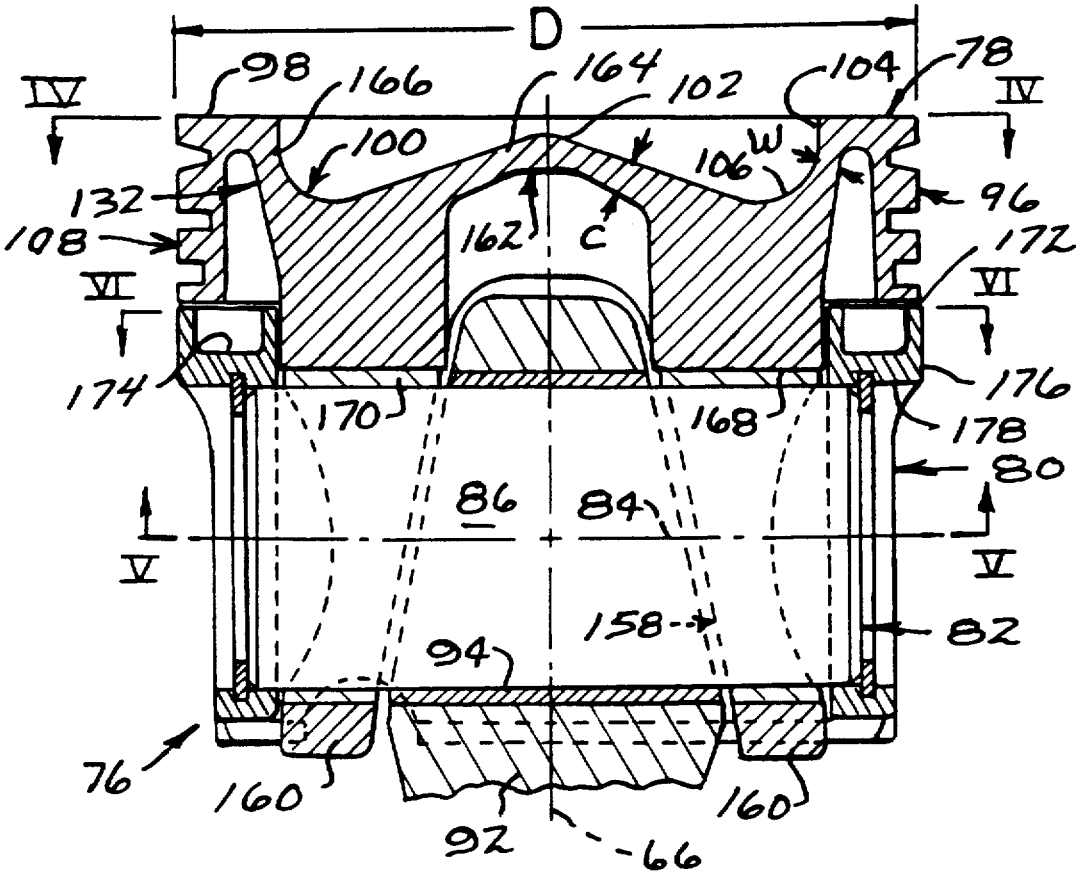
FIG. 2 is longitudinal vertical sectional view of a portion of the piston assembly illustrated in FIG. 1 as taken along the line II—II thereof.

Referring now to FIGS. 1 and 2, a diesel engine 10 of the multi-cylinder type includes a bottom block 12, a top block or spacer portion 14, and a cylinder head 16 rigidly secured together in the usual way by a plurality of fasteners or bolts 18.

A midsupported cylinder liner 48 has a cylindrical upper portion 52 which is a stabilizingly supported by the top block 14 and defines a piston bore 54 having a central axis 66. In this regard, cross reference is made to U.S. Pat. No. 4,638,769 issued to B. Ballheimer on Jan. 27, 1987 which further discusses the features and advantages of the multipiece cylinder block with midsupported liner discloses herein. The engine could however be of any conventional design.

The diesel engine 10 further includes first and second cooling oil direction nozzles 74 and 75 as is shown in the lower right portion of FIG. 1. The first nozzle 74 is rigidly secured to the bottom block 12 and is operationally associated with a conventional source of pressurized oil, not shown, to supply a narrow jet of engine lubricating oil substantially vertically in a preselected region of an articulated piston assembly 76. The second nozzle 75 is also secured to the bottom block, but is angularly inclined away from the vertical to impinge a jet of cooling oil on another region of the piston assembly 76.

The articulated piston assembly 76 of the diesel engine 10 includes a forged upper steel piston member 78 and a lower forged aluminum piston skirt 80 which are articulately mounted on a common steel wrist pin or gudgeon pin 82 having a longitudinally oriented central axis 84. A conventional connecting rod 90 having an upper eye end 92 and a steel-backed bronze sleeve bearing 94 therein is operationally connected to, and driven by the wrist pin 82.

Figure 4:
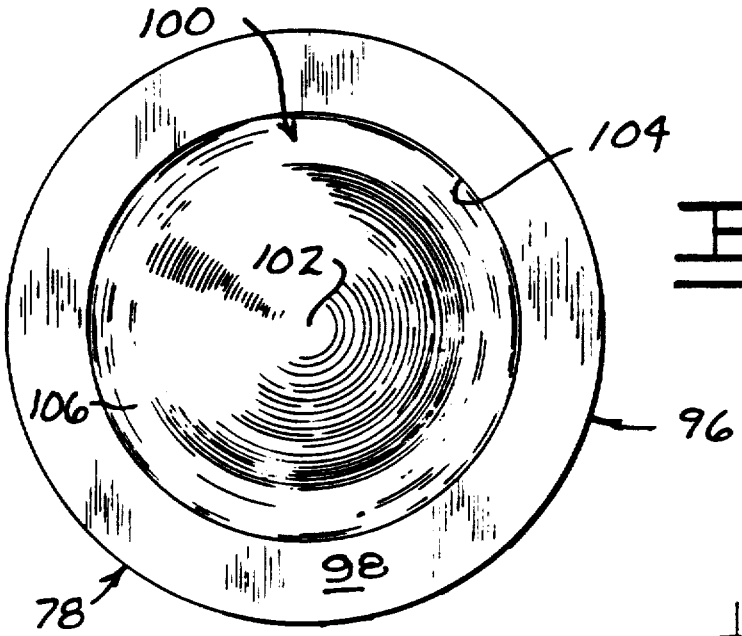
FIG. 4 is a top view of the piston member shown in FIG. 2 as taken along line IV—IV thereof.
Figure 5:
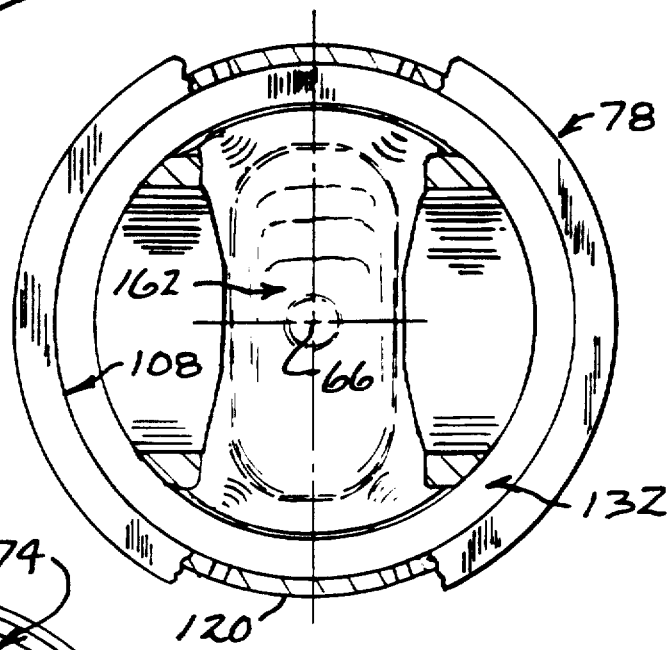
FIG. 5 is a section view solely of the piston member shown in FIG. 2 as taken along line V—V thereof.

As best shown in FIGS. 2 and 4, the steel piston member 78 has an upper portion 96 of substantially cylindrical shape and a preselected maximum diameter "D" as is illustrated. The upper portion 96 has a fully machined peripheral top surface 98 that is flat, or is located on a plane perpendicular to the central axis 66, and a recessed symmetrical crown surface 100 that in the instant example is a fully machined surface of revolution about the central axis 66. In general, the crown surface 100 has a centrally located apex portion 102 elevationally disposed below the top surface 98, a peripheral or outer axial surface 104 and an annular trough 106 that smoothly blends with the apex 102 and the axial surface 104.

Figure 3:
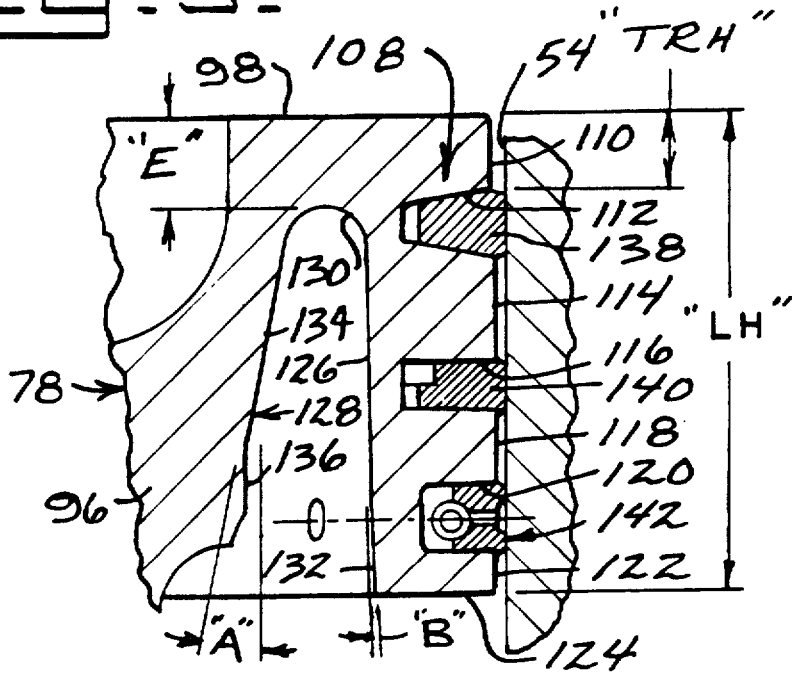
FIG. 3 is an enlarged fragmentary portion of the top peripheral region of the piston member shown in FIGS. 1 and 2 to better show details of construction thereof.

As is shown best in FIG. 3, the piston member 78 further includes a relatively thin tubular wall 108 that depends from the outer edge of the top surface 98. The overall height identified by the letters "LH" of the tubular wall 108 in this instant example was 31 mm. The tubular wall defines in serially depending order fully around the periphery thereof a first or top land 110, a top ring groove 112 having a keystone or wedge-like shape in cross section, a second or upper intermediate land 114, an intermediate ring groove 116 of rectangular cross section, a third or lower intermediate land 118, a bottom ring groove 120 of rectangular cross section, and a forth or bottom land 122 that is terminated by a lower radial fully machined end wall surface 124. In the instant embodiment the minimum elevational distance between the top surface 98 and the top ring groove 112, indicated by the letters "TRH" was 5 mm. An annular, generally axial, inwardly facing tapered wall surface 126 is also delineated by the wall 108 and extends upwardly from the end wall surface 124.

The body portion 96 of the piston member 78 is additionally defined by an annular radially outwardly facing wall surface 128 spaced radially inward from the inwardly facing wall surface 126 and a downwardly facing transition wall portion 130 that is blendingly associated with the wall surfaces 126 and 128 to collectively define an annular cooling recess 132 of a precisely defined cross-sectional shape. It may be noted that the top of the cooling recess 132 is in juxtaposed elevational relationship with the top of the ring groove 112. It is also elevationally disposed directly underneath the peripheral top surface 98 of the piston member 78 and within an elevational distance therefrom identified by the letter E. In one embodiment the distance "E" was about 5.5 mm.

In actuality, the wall surface 128 of the instant example is defined by an upper fully conical portion 134 having an inclination angle "A" with respect to the central axis 66 of approximately 12.33 degrees as is shown in FIG. 3, and fully cylindrical portion 136 below it. On the other hand the wall surface 126 is fully conical and has a inclination angle "B" of approximately 1.17 degrees. The inwardly facing wall surface 126, the outwardly facing wall surface 128 and the downwardly facing transition wall portion 130 are all fully machined surfaces of revolution. It may be noted that the radial thickness between the inwardly facing wall surface 126 and the innermost portion of the top groove 112 is slightly larger than the radial thickness of the same wall surface and the innermost portion of the seal ring groove 116. Hence, the latter radial thickness is the most critical dimension, and in the instant example the minimum acceptable value thereof was 1.74 mm. Preferably, such value is 3 or 4 mm. The seal grooves 112, 116, and 120 are all fully machined surfaces of revolution so that the critical cross-sections radially inwardly thereof are also precisely controlled.

Figure 7:
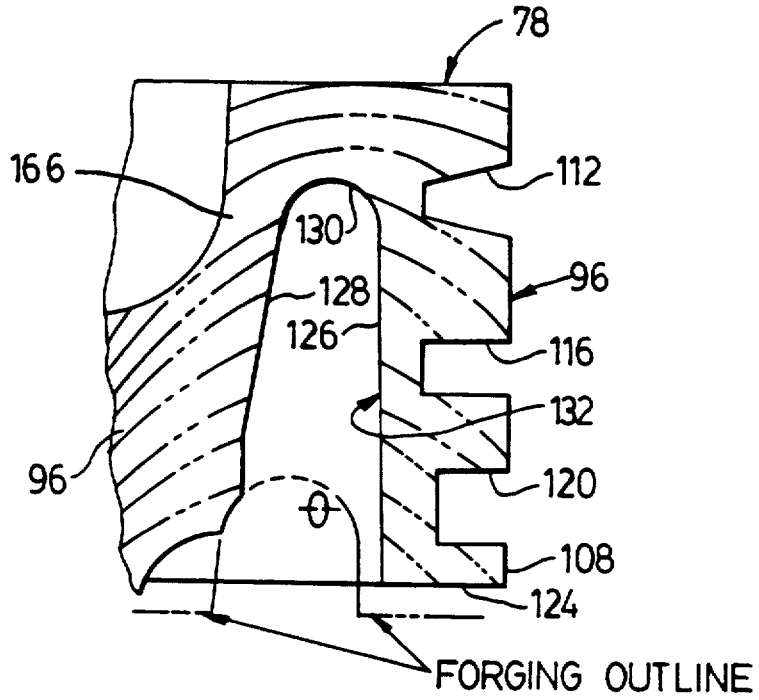
FIG. 7 is an enlarged fragmentary cross sectional view of the top peripheral region of the piston member shown in FIGS. 1 and 2 which shows the flow lines of a simple forged piston member with only a portion of the cooling recess forged.
Figure 8:
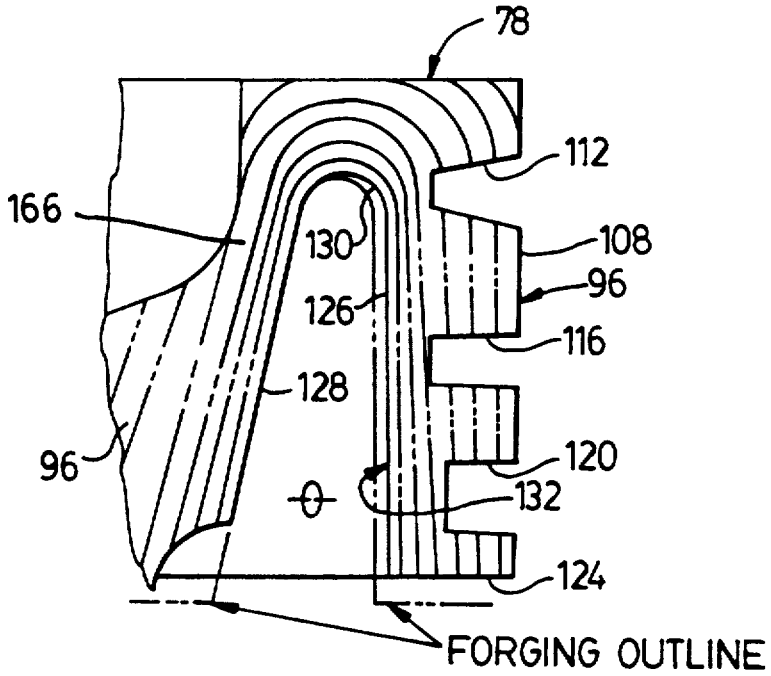
FIG. 8 is an enlarged fragmentary cross sectional view of the top peripheral region of the piston member shown in FIGS. 1 and 2 which shows the flow lines of a forged piston member with a deeply forged cooling recess.

As an alternative, the annular cooling recess 132 could be of any configuration to be forged such as the shallow recess shown in FIG. 7 or as an alternative the deep recess as shown in FIG. 8 As further shown in FIGS. 7 and 8, the grain flows obtained by the different depth recesses are shown by use of phantom lines. In the alternative arrangement as shown in FIG. 8, it may be only necessary that inwardly facing wall surface 126 be a machined surface of revolution so that the critical cross section between the surface and the seal ring groove 116 be precisely controlled.

The piston assembly 76 also includes a top split compression ring 138 of a keystone shape which is received in the top ring groove 112, an intermediate split compression ring 140 of a stepped rectangular cross section which is received in the intermediate ring groove 116, and an oil ring assembly 42 which is received in the bottom ring groove 120.

As shown in FIGS. 1 and 2, the steel piston member 78 also has a lower portion 158 including a pair of depending pin bosses 160 blendingly associated with the outwardly facing wall surface 128 of the cooling recess 132 and blendingly associated also with a downwardly facing concave pocket 162 defined by the upper portion and centered on the axis 66. The concave pocket is spaced substantially uniformly away from the apex portion 102 of the crown surface 100 so as to define a relatively thin crown 164 of generally uniform thickness "C" as is shown in FIGS. 1 and 2. For example, in the embodiment illustrated, the thickness "C" was approximately 5 or 6 mm. A relatively thin and substantially conically oriented web or wall 166 of a minimum thickness "W" is defined between the trough 106 and juxtaposed annular cooling recess 132. In the embodiment illustrated, the thickness "W" was approximately 4 to 7 mm. Each of the pin bosses 160 has a bore 168 therethrough which are adapted to individually receive a steel-backed bronze bearing sleeve 170 therein. These bearing sleeves 170 are axially aligned to receive the wrist pin 82 pivotally therein.

Figure 6:
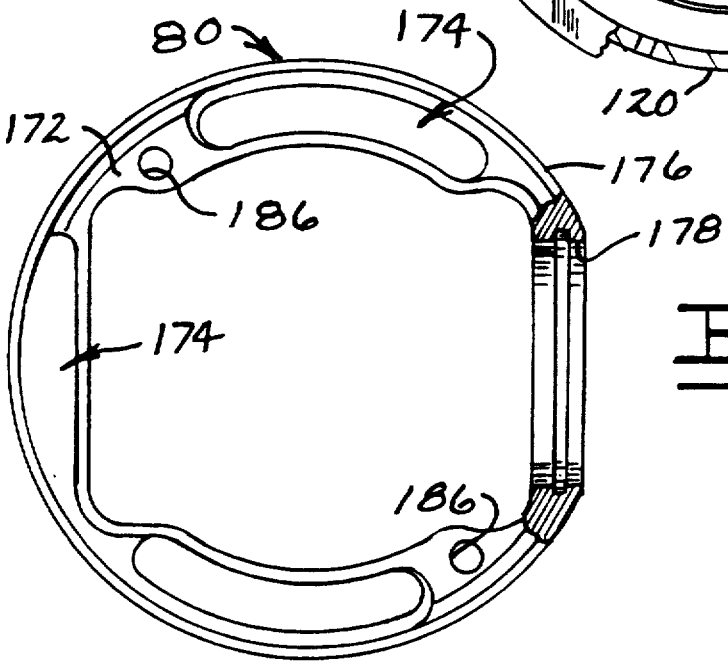
FIG. 6 is a top view solely of the piston skirt shown in FIG. 2 as taken along line VI—VI thereof.

Referring now to FIGS. 1, 2 and 6 the piston skirt 80 has a top peripheral surface 172 in close non-contacting relationship with the lower end wall surface 124 of upper piston member 78 with a fully annular, upwardly facing coolant trough 174 defined therein. It further has a slightly elliptical external surface 176 therearound which depends from the top surface 172. A pair of aligned wrist pin receiving bores 178 are formed through the piston skirt 80. The piston skirt 80 is thus articulately mounted on the wrist pin 82 which is insertably positioned in both bores 178.

A pair of axially oriented bosses 184 are defined within the skirt 80 so that a corresponding pair of lubrication passages 186 can be provided fully axially therethrough. The lubrication passages 186 provide for communication with the oil trough 174 and the cooling recess 132. The lubrication passages 186 are positioned diagonally opposite each other so that the skirt 80 can be mounted on the wrist pin 82 in either of the two possible positions and so at least one of them will be axially aligned with the first oil jet nozzle 74. The skirt 80 is also provided with diagonally opposite, semi-cylindrical recesses 188 which open downwardly at the bottom of the skirt to provide clearance from the nozzles 74 and 76 when the skirt is reciprocated to its lowest elevational position.

INDUSTRIAL APPLICABILITY

The unique forged steel piston member 78 in this application is used with an articulate piston assembly 76. The articulated piston assembly 76 is used in a high combustion chamber pressure engine 10 having a combustion chamber pressure of about 15,170 kPa (2200 psi). The piston member 78 allows the specific output to be increased. As shown in FIG. 1, the articulated piston assembly 76 is used with an engine 10 having a mid-supported cylinder liner 48 and a two piece cylinder block 12,14 construction In operation, during reciprocating movement of the piston assembly 76 the first nozzle 74 directs lubricating oil into the skirt passage 186 aligned therewith. The oil jet continues upwardly whereupon it makes contact with the inwardly facing wall surface 126, the outwardly facing wall surface 128 and the downwardly facing wall portion 130 collectively defining the annual cooling recess 132 of the upper portion 96 of the piston member 78. A significant portion of the oil is caught by the skirt trough 174 as the piston assembly is reciprocated where it is advantageously splashed in a turbulent "cocktail shaker" action cooling the peripheral surfaces 126, 128, and 130 of the cooling recess 132 and thus the web 166 and the relatively thin tubular wall 108 defining the ring grooves 112, 116, and 120. Simultaneously, the second nozzle directs oil in a narrow column against the connecting rod 90 and against the concave pocket 162 or underside of the crown 164.

Referring to FIG. 3, it may be noted that the [op] *top* of the cooling recess 132 is in juxtaposed elevational relationship with the top of the ring groove 112. It is also elevationally disposed directly underneath the peripheral top surface 98 of the piston member 78, and within an elevational distance therefrom identified by the letter E. In one embodiment the diameter D was 124 mm, and the distance E was about [5 to 5 mm] *5.5 mm*. Thus, relatively thin, substantially constant wall thicknesses are created for substantially even heat distribution and for maximum cooling. The inner wall surface 126 is a machined surface of revolution about the central axis 66 which permits precise dimensional control and concentricity between the bottom of the ring groove 112, 116, and 120 and the wall surface. Dimensional control and concentricity between the bottoms of the ring grooves and the surface 126 and especially the bottom of the closest ring groove 116 to the surface 126 is extremely critical because any deviation can materially weaken the tubular wall 78 resulting in cracking, uneven heat distribution and/or differential thermal distortion. The inwardly facing wall surface 126, the outwardly facing wall surface 128 the downwardly facing portion 130 defining the cooling recess 132 are all machined surfaces of revolution about a central axis 66 eliminate any imperfections that could cause the propagation of cracks and differential thermal distortion. By machining the surfaces 126 and 128 and the downwardly facing wall 130, wall thicknesses, concentricity and surface finishes can all be precisely controlled. Alternatively, with the arrangement shown in FIG. 8 with a deep forged recess 132, it may only be necessary that the inwardly facing wall surface 126 be a machined surface of revolution for dimensional control and concentricity with relation to the bottoms of the ring grooves 112, 116, and 120, and specifically the closest ring groove 116.

In addition to the dimensional constraints mentioned above, it is to be appreciated that the articulated piston assembly 76 is preferably manufactured in a particular way devoid of complex shapes and by using certain materials. Specifically, the upper steel piston member 78 is preferably forged from a chrome-moly alloy steel material such as a basically 4140 modified steel material. The lower aluminum piston skirt 80 is likewise preferably forged an alloy aluminum material such as a basically SAE 321-T6 modified aluminum material.

The aforementioned alloy steel is particularly adaptable to Class II forging procedures, and can provide an austenitic grain size 5 or finer which is highly desirable to resist the high compression pressures above about 13,790 kPa (2,000 psi), and preferably above about 15,170 kPa (2,200 psi). Etched cross sectional samples of the forged steel piston member have indicated that the grain flow lines therein are generally or broadly oriented in an inverted U-shaped configuration that roughly approximates the shape of the piston member portion shown in FIGS. 3, 6 and 7 and/or roughly aligns the grain flow lines with the web 166 and the tubular wall 108, and this contributes substantially to the cross sectional strength thereof.

The aforementioned forged aluminum alloy has a high hardness, excellent wear resistance, and a relatively low coefficient of thermal expansion.

Other aspects, objects and advantages of this invention can be obtained from a study of the drawings, the disclosure and the appended claims.

What is claimed:

1. [AΘ *An articulated piston assembly comprising an upper* forged *one piece* steel piston member, *a lower aluminum skirt member, and a pin articulately mounting the members* for reciprocating movement in an engine, *the upper piston member* comprising:

an upper portion of substantially cylindrical shape and having a central axis, a top surface, a tubular wall depending from the top surface and *forged integral with the upper portion, the tubular wall* having a peripheral groove *having a bottom surface and* adapted to receive a sealing ring, *the peripheral groove being spaced a preselected minimal elevational distance TRH from the top surface*, a lower end surface, and an inwardly facing wall surface extending upwardly from the lower end surface;

the upper portion further including an outwardly facing wall surface spaced radially inwardly from the inwardly facing wall surface and a downwardly facing transition portion blendingly associated with the inwardly and outwardly facing wall surfaces to collectively define an annular cooling recess, the transition portion being [elevational] *elevationally* spaced a relatively short distance "E" from the top surface, *the top of the cooling recess being in juxtaposed elevational relation with the peripheral groove to provide for removing heat from around the peripheral groove*; and the inwardly facing wall surface being a machined surface of revolution about the central axis [integral or one piece forging] *to maintain dimensional control and concentricity between the bottom surface of the peripheral groove and the inwardly facing wall surface.*

2. The [forged steel] *articulated* piston [member] *assembly* of claim 1 wherein the outwardly facing wall surface and the downwardly facing transition portion are machined surfaces of revolution about the central axis.

3. The [forged steel] *articulated* piston [member] *assembly* of claim 1 *wherein the upper piston member* further [including] includes a lower portion having a pair of depending pin bosses blendingly associated with the cooling recess and individually defining a bore, and the bores being aligned along a common axis.

4. The [forged steel] *articulated* piston [member] *assembly* of claim 3 wherein the upper portion and lower portion are an integral or one-piece forging.

5. The [forged steel] *articulated* piston [member] *assembly* of claim 4 wherein the material used for the [forging] *upper piston member* is a chromium-molybdenum steel.

6. The forged steel piston member of claim 1 wherein the elevational distance "E" between the top surface and the top of the cooling recess is approximately 6 mm.

7. The [forged steel] *articulated* piston [member] *assembly* of claim 1 wherein the upper portion defines a recessed crown surface which contains machined surfaces of revolution about the central axis so that a relatively uniform web is defined between the crown surface and the cooling recess.

8. The [forged steel] *articulated* piston [member] *assembly* of claim 1 wherein the minimum radial thickness between the cooling recess and the innermost portion of the peripheral groove is about 1.74 mm.

9. The piston *assembly* of claim 7 wherein the upper and lower portions are an integrally formed forging.

10. The piston assembly of claim 7 including an aluminum piston skirt, and a wrist pin connecting the piston member to the piston skirt.

11. The piston assembly of claim 10 wherein the outwardly facing wall surface and the downwardly facing transition portion are machined surfaces of revolution about the central axis.

12. An [engine] *articulated* piston assembly for an engine of the type having a block defining a bore, a cylinder liner supported in the block and defining a piston bore, and a cylinder head connected to the block, wherein the improvement comprises:

a forged steel *piston* member [piston] having an upper portion of substantially cylindrical shape and having a central axis, a peripheral top surface, a tubular wall depending from the top surface and defining an outwardly facing top land, a top ring groove *spaced* a preselected minimal elevational distance TRH *of about 5 mm* from the top surface, a lower end surface, and an annular inwardly facing wall surface extending upwardly from the lower end surface;

the upper portion further including an annular outwardly facing wall surface spaced radially inward from the inwardly facing wall surface and a downwardly facing transition portion blendingly associated with the inwardly and outwardly facing wall surfaces to collectively define an annular cooling recess located in juxtaposed relation with to the top ring groove, the inwardly facing wall surface being a machined surface of revolution about the central axis; [and]

a lower portion including a pair of depending pin bosses blendingly associated with the cooling recess and individually defining a bore and with the bores being aligned on a common axis;

*a piston skirt defining a pair of wrist pin receiving bores aligned with the bores of the pin bosses; and*

*a wrist pin in the aligned bores for articulately connecting the piston skirt and the piston member.*

* * * * *